Feb. 14, 1939.  W. E. BAHLS  2,147,417

VACUUM TIGHT INSULATION LEAD-IN STRUCTURE

Original Filed Oct. 21, 1936   2 Sheets-Sheet 1

WITNESSES:
C. J. Weller
R. W. Bailey

INVENTOR
Walter E. Bahls.
BY F. W. Lyle.
ATTORNEY

Patented Feb. 14, 1939

2,147,417

UNITED STATES PATENT OFFICE 2,147,417

VACUUM-TIGHT INSULATION LEAD-IN STRUCTURE

Walter E. Bahls, Forest Hills, Pa., assignor to Westinghouse Electric & Manufacturing Company, East Pittsburgh, Pa., a corporation of Pennsylvania Original application October 21, 1936, Serial No. 106,798. Divided and this application January 29, 1937, Serial No. 122,987

3 Claims. (Cl. 250—27.5)

My invention relates to a vacuum-tight insulated lead-in construction and especially such construction applied to electron discharge devices.

This application is a division of my copending application Serial No. 106,798, filed October 21, 1936, for Vacuum-tight insulated lead-in structures.

An object of my invention is to provide a very strong vacuum-tight lead-in construction that will withstand a very great difference of pressure on its opposite sides.

Another object of my invention is to provide a lead-in construction for vacuum devices which will permit the utilization of much higher temperatures during the exhausting and degasifying of the parts.

Other objects and advantages of my invention will become apparent from the following description and drawings in which.

In the prior art devices employing seals between lead-ins and metal containers, glass has been heretofore utilized. In such constructions, principally that of vacuum electron discharge tubes, it is necessary that the device be heat-treated at a very high temperature in order to degasify the interior elements. An extensive portion of a glass wall cannot be utilized with such heat treatment because the glass will become molten and collapse. On the other hand, if not much glass is used there is apt to be a very short distance between the lead-in and the metal wall of the container that will provide a leakage path with the accumulation of dirt and moisture.

It is an object of my invention to utilize a ceramic material for the body of insulating material and to utilize a coating of glass to seal the ceramic material to the metal casing. I also contemplate using special forms by which the device will withstand pressure from within or without.

Figure 1:
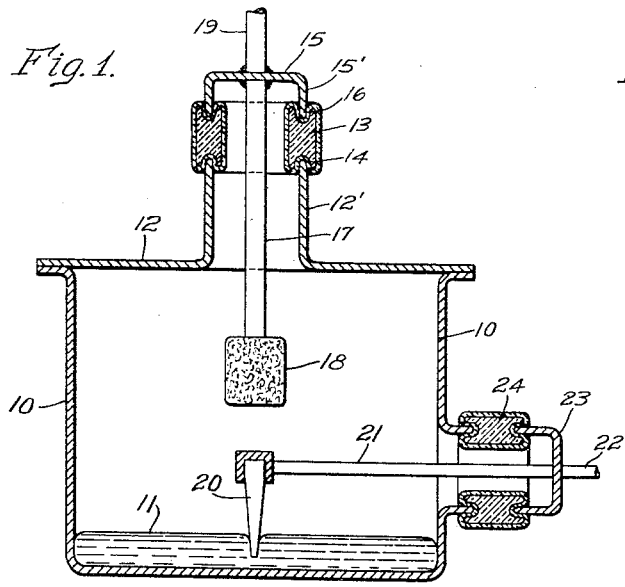
Figure 1 is a view through a device incorporating my invention with the walls in cross section and the lead-in and interior parts in elevation.

Figure 1 illustrates a particular type of discharge device utilizing my invention. This device has a container wall 10 of metal such as iron, steel or their alloys. In the particular type of device disclosed, the container has a mercury pool 11 forming the cathode therein. To this container 10 is welded a metal plate 12, preferably of an alloy of 24% to 30% nickel, 5% to 25% cobalt, less than 1% manganese and the remainder principally iron, and having an outwardly extending tubular flange 12'. This tubular flange 12' is sealed to an annular ring 13 of porcelain. This annular ring has preferably a slot 14 into which the edge of the flange 12' extends and which slot is filled with glass. This glass is preferably of the boro-silicate type of glass. This glass has a major percentage of silicon dioxide and also preferably has such silicon dioxide in an amount from 65% to 75%. This glass also preferably has less than 10% PbO, less than 6% $Al_2O_3$ and 10 to 25% $B_2O_3$. The particular type of glass that I prefer to use has the following analysis:

| | Percent |
|---|---|
| $SiO_2$ | 67.3 |
| $B_2O_3$ | 24.6 |
| $Al_2O_3$ | 1.73 |
| $Na_2O$ | 4.6 |
| $K_2O$ | .94 |
| $As_2O_3$ | .14 |

The glass makes a vacuum-tight seal between the metal flange 12' and the annular ring 13. The boro-silicate glass also preferably extends over at least one side of the porcelain ring and preferably both. A cup shaped cap 15 has preferably a downwardly extending flange 15' fitting into an upper annular slot 16 of the porcelain ring and sealed thereto by means of the aforementioned glaze of glass. A lead-in 17 of any desired metal is welded to the inner side of the cup 15 and at its inner end preferably supports an electrode such as the anode 18. An exterior conductor 19 can be welded to the exterior surface of the cup 15 to make contact therethrough to the interior electrode structure.

This type of device may have any one or a combination of auxiliary electrodes. One such type of device would comprise a make-alive 20 constructed of a high resistance material such as carborundum or boron-carbide in contact with the mercury and supported by a conductor 21. This conductor 21 could have an exterior connection 22 connected to 21 by a cap 23 sealed in a ceramic ring 24 similar to the supporting and connecting structure of the anode 18.

It is apparent that the structure of Fig. 1 is illustrative of a particular type of discharge devices and that the lead-in structure could be applied to other types such as the hot cathode and also the evacuated non-gaseous type of device. If the container 10 and cover plate 12 and flange 12' is of only one piece, it is preferable to have it of the alloy of nickel-cobalt-iron previously described.

Figure 2:
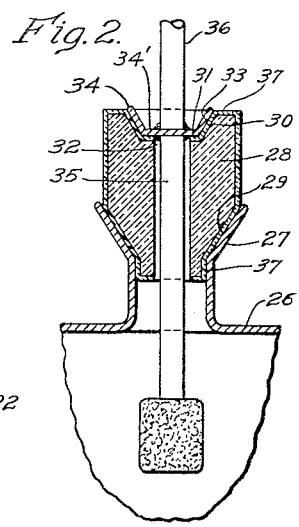
Figs. 2, 3, 4, 5 and 6 are modifications of the lead-in construction of Fig. 1; and, Figs. 7 and 8 are curves illustrating the expansion of preferred materials utilized in the preceding sealed construction.

Fig. 2 illustrates a modification of the seal structure of Fig. 1. In Fig. 2 the flange 26 has preferably an outwardly tapered or dished portion 27. The porcelain section 28 has a similar tapered or dished contour 29 fitting within the contour 27. The upper portion of the porcelain section also has a downwardly tapered or inwardly dished opening 30 terminating in a flat portion 31 adjacent the central opening 32 of the hollow porcelain member 28. A metal closing member 34 for this upper portion of the porcelain section has a correspondingly tapered or dished portion 33 similar in contour to the contour 30 of the porcelain and also a flat portion 34' to rest upon the corresponding flat portion 31 and to close the central opening 32 of the porcelain member 38. The anode conductor 35 is welded to the under portion of this metal closing member and an exterior conductor 36 is welded to the upper portion of the metal closure member 34. The metal portions are sealed to the porcelain by means of the glass glaze 37 previously described. The glass glaze may also extend over the exterior of the porcelain section as disclosed. It will be noted how the tapered portion of the porcelain at 29 and the tapered portion 27 of the metal casing will provide a very tight dished seal if a vacuum is maintained within the device because the exterior pressure will cause the porcelain to set more firmly on the tapered flange 27. The exterior pressure against the closure member will also cause it to set more firmly on the top of the porcelain member.

Figure 3:
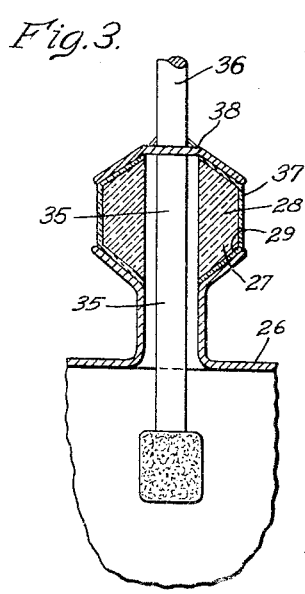

Fig. 3 illustrates a modification of the upper portion of the device in Fig. 2 in which the metal portion 38 is tapered down and outwardly instead of upwardly as in Fig. 2. This member 38 is like an inverted dish placed over the top of the porcelain section and the upper portion of this porcelain has a contour cooperating with the contour of the metal. The flat portions 31 may be eliminated in Fig. 2 if desired as shown in Fig. 3, or they may likewise be present in Fig. 3.

Figure 4:
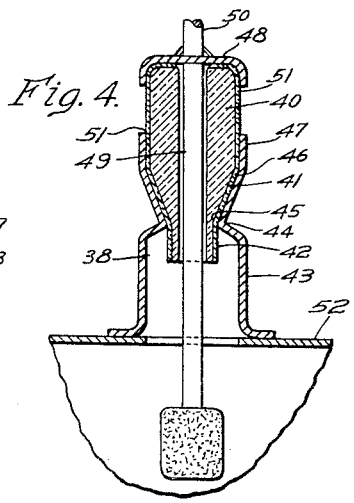

Fig. 4 illustrates a very firm seal in which the porcelain portion 40 has an inwardly tapered portion 41 extending to a small diametered portion 42. Surrounding this porcelain or ceramic portion is a tubular metal portion 43 extending inwardly at 44 to meet the tapered portion 41 at 45 and then extending into a contour at 46 similar to that of the porcelain until it forms an extending tubular portion 47 for the large diameter of the porcelain. A cap shaped metal closure member 48 seals the central opening of the porcelain containing the conductor 49. An exterior lead 50 is welded to the cap 48. In this construction, the cap 48 and the tubular member 43 may be of the nickel-colbalt-iron alloy previously described which will seal to the glass coating 51 on the porcelain and other metal material may be used for the main portion of the metal container 52.

Figure 5:
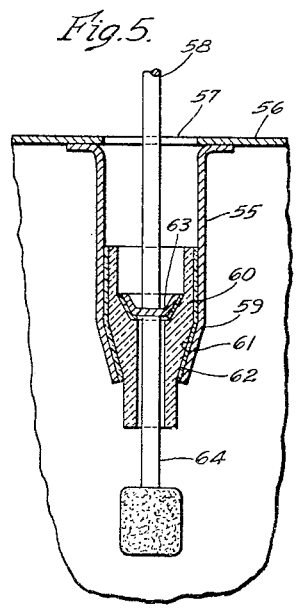

In case it is not desired to have the sealed lead-in construction extending from the exterior portion of the casing, but to be placed mainly within the confines of the casing, a structure such as that illustrated in Fig. 5 may be utilized. In this case, a tube 55 is welded to the interior side of the casing 56 adjacent the opening 57 for the lead-in 58 therethrough. The inner end 59 of this tube is tapered and the porcelain section 60 has a similar tapered portion 61 which fits snugly adjoining the tapered or dished portion 59. A sealing glass material 62 such as the boro-silicate glass previously described seals the porcelain to the metal. The exterior lead-in 58 is welded to a cap which may be similar to the caps previously described such as that of Fig. 2, and this cap in turn has the anode conductor 64 welded to its inner surface.

Figure 6:
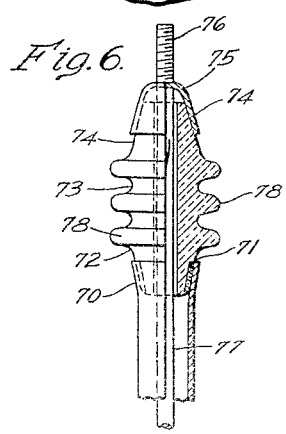

In Fig. 6 is disclosed another type of insulator in which the tube 70 is sealed by means of glass 71 to the lowered tubular tapered or dished portion 72 of an elongated insulator 73. The upper tapered portion 74 of the insulator is closed with a cap 75 which has an exterior lead 76 and an interior lead 77 welded thereto. The insulator 73 preferably has extensions 78 to provide a greater creepage distance between the metal portions 70 and 75.

I have previously described a preferred sealing metal as being a nickel-cobalt-iron alloy and also the glass as being a boro-silicate type because these substances have a similar coefficient of expansion substantially in the region of 4.6 to 7.0 times $10^{-6}$ cm. per degree C. I also desire to utilize ceramic material such as porcelain of a substantially similar coefficient of expansion. One such type of porcelain is composed of 30% feldspar, 25% flint and 45% clay. Typical chemical analysis of a particular type of this porcelain known as "Derry Plastic Body" gives:

|  | Percent |
| --- | --- |
| $SiO_2$ | 70.97 |
| $Al_2O_3$ | 23.15 |
| $Fe_2O_3$ | 0.39 |
| $TiO_2$ | 0.76 |
| CaO | 0.12 |
| MgO | 0.14 |
| $Na_2O$ | 1.09 |
| $K_2O$ | 3.30 |

Figure 7:
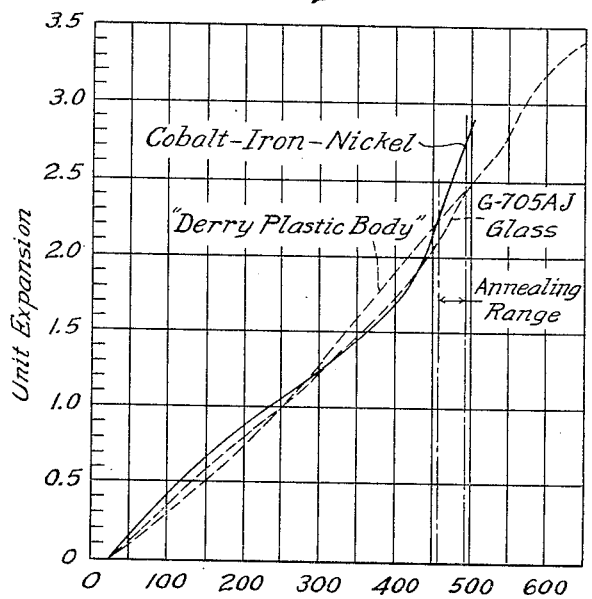

In Fig. 7 I have shown curves disclosing the unit expansion over a temperature range for these three materials.

Figure 8:
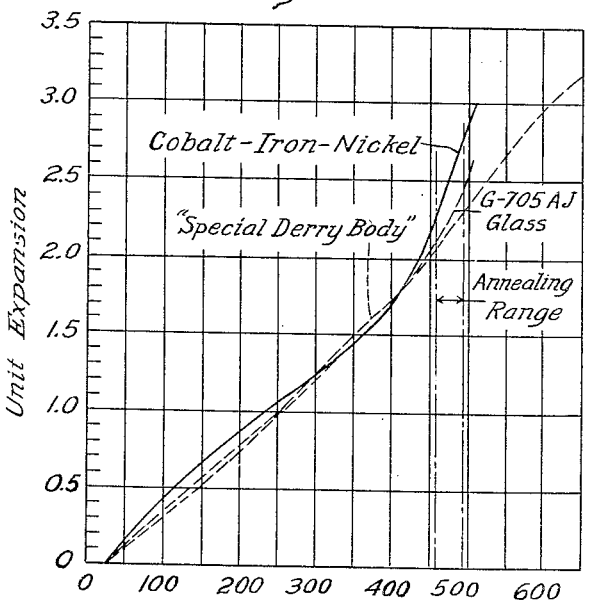

The metals, porcelains and glasses do not necessarily have to have the same coefficient of expansion throughout the temperature range, but do have to have substantially the same coefficient of expansion in the annealing range of the glass as illustrated in Figs. 7 and 8. After the sealing has taken place, for example, in the temperature range 800° to 1100° C., the assembly is cooled to the annealing range of the glass and any stresses developed due to the difference of expansion as the different parts cool are then relieved because the glass, although set, is still plastic enough to relieve stresses. The time required for this annealing will depend upon the exact type of glass, the temperature at which it is held and how closely the various materials match in the higher temperature range. This time will, in general, be from a few minutes to four hours. The seal may be rapidly cooled, and only care taken that thermal gradients do not crack the porcelain.

The annealing range covers from the strain point to the annealing point. The strain point is defined as that temperature at which practically all stresses (90% or better) are relieved in a period of four hours. The anneal point is defined as that temperature at which practically all stresses are relieved in fifteen minutes.

The porcelains and glasses are of brittle type materials which are stronger in compression than tension. It is accordingly desirable that the metal shall have a slightly higher unit expansion in the annealing range so that, after the seals have been annealed and are cooled, the metal contracts slightly more than the porcelain and tends to clamp on the porcelain putting it slightly in compression.

Other types of porcelain with the desired coefficient of expansion may, of course, be substituted for this particular Derry plastic. Fig. 8 discloses a curve for such a body which I have designated as a "special Derry body" in which pyrophyllite was substituted for the flint in the regular "Derry plastic body" together with curves for the preferred metal and glass in Fig. 7.

Although I have shown and described the invention applied to discharge tubes, many other applications of my invention are possible. Such applications include bushings or lead-ins for condensers especially where such bushings must be oil or air-tight, electrical lead-ins for hermetically-sealed refrigerators, lead-in bushings for sealed oil-filled transformers, lead-ins for motors having a special cooling atmosphere as hydrogen, etc. This list is to be taken as illustrative and not as a limiting list.

Also, although I have described various modifications of my invention, various changes may be made in the shape, arrangement, selection and application of the various elements and combinations disclosed. I accordingly desire only such limitations to be placed on the following claims as is necessitated by the prior art.

I claim as my invention:

1. A vacuum-tight electrical lead-in construction comprising a metal casing portion, a hollow porcelain member having one open end sealed to said metal casing structure by an intervening layer of glass, a metal closure member extending across the other end of said porcelain member, a dished seal having an intervening layer of glass between said metal closure member and said porcelain member, and a conductor attached to said metal closure member and extending through said porcelain structure to within said metal casing portion, said conductor being of substantially smaller diameter than the opening through said porcelain member through which it extends.

2. An electrical discharge device comprising a metal casing having a portion comprising an alloy of 24% to 30% nickel, 5% to 25% cobalt, less than 1% manganese and the remainder principally iron, a hollow porcelain member having one open end sealed to said tubular extension by an intervening layer of borosilicate glass sandwiched between said porcelain member and said portion, a metal closure member comprising the aforesaid alloy extending across the other end of said porcelain member, a dished seal between said metal closure member and said porcelain member and including an intervening layer of borosilicate glass sandwiched between said porcelain member and said portion, a conductor attached to said metal closure member and extending through said porcelain structure to within said metal casing.

3. A vacuum-tight electrical lead-in construction comprising a metal casing portion comprising an alloy of 24% to 30% nickel, 5% to 25% cobalt, less than 1% manganese and the remainder principally iron, a hollow porcelain member having one open end sealed to said metal casing structure by an intervening layer of borosilicate glass sandwiched between said porcelain member and said portion, a metal closure member comprising the aforesaid alloy extending across the other end of said porcelain member, said metal closure member and said porcelain member having adjacent dished contours, a vacuum-tight seal between said adjacent dished contours and including an intervening layer of borosilicate glass sandwiched between said porcelain member and said portion, and a conductor attached to said metal closure member and extending through said porcelain member to within said metal casing portion.

WALTER E. BAHLS.